US006998049B1

(12) United States Patent
Meyer et al.

(10) Patent No.: US 6,998,049 B1
(45) Date of Patent: Feb. 14, 2006

(54) METHOD FOR PREVENTING THE FORMATION OF BIOLOGICAL FILMS

(75) Inventors: Bernhard Meyer, Mettmann (DE); Ralf Krack, Dusseldorf (DE); Alfred Laufenberg, Dormagen (DE)

(73) Assignee: Henkel Ecolab GmbH & Co. OHG, Dusseldorf (DE)

( * ) Notice: Subject to any disclaimer, the term of this patent is extended or adjusted under 35 U.S.C. 154(b) by 701 days.

(21) Appl. No.: 10/049,087

(22) PCT Filed: Jul. 27, 2000

(86) PCT No.: PCT/EP00/07231

§ 371 (c)(1),
(2), (4) Date: Apr. 30, 2002

(87) PCT Pub. No.: WO01/10218

PCT Pub. Date: Feb. 15, 2001

(30) Foreign Application Priority Data

Aug. 6, 1999 (DE) ................................ 199 37 300

(51) Int. Cl.
*C02F 1/50* (2006.01)

(52) U.S. Cl. ........................ 210/632; 210/636; 210/638; 210/697; 210/741; 210/746; 210/753; 210/754; 210/755; 210/759; 210/764; 422/28; 422/36; 422/37

(58) Field of Classification Search ................ 210/636, 210/638, 639, 741, 746, 752, 696–701, 754, 210/755, 758, 759, 764; 422/28, 37
See application file for complete search history.

(56) References Cited

U.S. PATENT DOCUMENTS

| 4,089,800 | A | * | 5/1978 | Temple .................. 427/213.31 |
| 4,278,548 | A | * | 7/1981 | Bettinger et al. ............ 210/636 |
| 4,561,981 | A | * | 12/1985 | Characklis .................. 210/696 |
| 4,740,308 | A | * | 4/1988 | Fremont et al. ............ 210/632 |
| 4,806,259 | A | * | 2/1989 | Amjad ........................ 510/162 |
| 4,988,444 | A | * | 1/1991 | Applegate et al. ........... 210/636 |
| 5,128,051 | A | * | 7/1992 | Theis et al. ................. 210/764 |
| 5,256,303 | A | | 10/1993 | Zeiher et al. ................ 210/700 |
| 5,411,666 | A | * | 5/1995 | Hollis et al. ................. 210/632 |
| 5,750,070 | A | * | 5/1998 | Tang et al. .................... 422/16 |
| 5,888,401 | A | * | 3/1999 | Nguyen ...................... 210/650 |
| 5,895,565 | A | * | 4/1999 | Steininger et al. ............. 210/85 |
| 6,180,056 | B1 | * | 1/2001 | McNeel et al. ................ 422/15 |
| 6,217,770 | B1 | * | 4/2001 | Haney et al. ................ 210/636 |
| 6,699,391 | B1 | * | 3/2004 | Baldridge et al. ........... 210/632 |

FOREIGN PATENT DOCUMENTS

| DE | 38 28 579 | 3/1990 |
| DE | 196 47 293 | 6/1998 |
| DE | 199 37 300 | 2/2001 |
| EP | 0 024 875 | 3/1981 |
| EP | 0 295 595 | 12/1988 |
| EP | 0 397 184 | 11/1990 |
| EP | 0 517 102 | 12/1992 |
| EP | 0 705 794 | 4/1996 |
| GB | 2 326 113 | 12/1998 |

OTHER PUBLICATIONS

Whittaker et al. "Evaluation of Cleaning Strategies for Removal Biofilms", Applied and Environmental Microbiology, vol. 43 (3), 1984, p 395-403.*

Amjad. "Applications of Antiscalants to Control Calcium Sulfate Scaling in Reverse Osmosis Systems", *Desalination*, vol. 54, (1985) 263-276.

Narziss. *Overview of Beer Brewing*, (1986) p. 331 and English translation.

Derwent Publications No. XP002150647 & JP 63 315119, Dec. 22, 1988.

* cited by examiner

*Primary Examiner*—Peter A. Hruskoci
(74) *Attorney, Agent, or Firm*—Merchant & Gould P.C.

(57) ABSTRACT

The invention relates to a method for improving the performance of filtration devices by adding P- and/or N-containing compounds to the medium to be filtered.

12 Claims, No Drawings

METHOD FOR PREVENTING THE FORMATION OF BIOLOGICAL FILMS

This invention relates to the use of formulations which, after addition to aqueous media passing through filtration units, improve the performance of the filtration units with time in relation to the performance with time of filtration units for the filtration of aqueous media to which these formulations have not been added.

It is basically known that aqueous media can be cleaned by filtration through filtration units. For example, the filtration units in question can be membrane units for the conditioning of water. The function of filtration units such as these is substantially to remove mineral, organic or microbiological impurities from the aqueous media to be filtered according to requirements. The filtration units are normally in operation for several days, weeks or even months before they are cleaned or overhauled. Depending on the type of filtration unit and the nature of the aqueous medium to be filtered, the performance of the filtration units deteriorates with time. This can be reflected, for example, in the fact that the differential pressure between the inflow and outflow side of the filtration unit is increased with the effect that the materials used in the filtration unit are subjected to greater mechanical stressing and hence to accelerated wear. As operation of the filtration unit continues, blockages can occur to the point where the filtration unit is brought to a standstill. The reduction in the performance of the filtration units is generally attributable to the fact that a layer of extracellular material is gradually formed over the filter materials used. For example, in the water conditioning field, experts often speak of the formation of biofilms in membrane units—so-called biofouling. The effect of the buildup of extracellular layers is that frequent stoppages for cleaning and disinfection are necessary. The result of this is that the filtration unit is not available for conditioning water during such stoppages which involves costs for interrupting the filtration process and for cleaning. If the necessary cleaning and disinfection intervals are not observed, the risk of failure of the water supply through blockage and the risk of microbiological impurities in the permeate increase because the extracellular layers can form a matrix for the growth of microorganisms under protected conditions. On the other hand, over-frequent cleaning and disinfection lead to increased wear, particularly where oxidative formulations are used, and hence to a reduced life of the filtration materials used.

The problem addressed by the present invention was to make it possible, by the addition of selected formulations to the aqueous media to be filtered, to increase the performance of the filtration units with time in relation to the performance with time of filtration units for the filtration of aqueous media to which these formulations have not been added.

The present invention relates to the use of formulations which a) contain at least one compound selected from the groups of nitrogen and phosphorus compounds, at least one ammonium compound preferably being present as the nitrogen compound, more particularly in quantities of 0.1 to 8 mg per liter of aqueous medium, and—in another preferred embodiment—the phosphorus compound being at least one phosphate compound which is preferably added in a quantity of 0.3 to 20 mg per liter of aqueous medium and b) are added to aqueous media passed through filtration units, the filtration units preferably containing at least one membrane filter element with pore sizes of 0.0001 to 1 $\mu$m and, more particularly, a membrane filter element with pore sizes of 0.0001 to 0.005 $\mu$m and—in a particularly preferred embodiment—achieving retention levels of 90 to 99.9% for sodium chloride in order to increase the performance of the filtration units with time in relation to the performance with time of filtration units for the filtration of aqueous media to which the formulations have not been added. The expert generally characterizes the various membrane filter elements as microfiltration, ultrafiltration, nanofiltration and reverse osmosis membranes. Characterizing the membrane filter elements on the basis of pore size over the entire range from microfiltration to reverse osmosis is only meant to be taken as a basic characterization. For example, where the formulations according to the invention are used to increase the performance of the particularly preferred reverse osmosis membranes with time, the corresponding membrane filter will not be characterized by its pore size but instead by its sodium chloride retention levels.

Where membrane filter elements are used in the filtration units, they preferably contain at least one material component selected from the groups of ceramic materials and/or organic polymers. In a particularly preferred embodiment, the membrane filter element contains at least one polyamide and/or polypiperazine amide.

In a preferred embodiment of the present invention, the performance of the filtration unit as a function of time is determined by measuring the differential pressure and/or the permeate flow. Where the formulations to be used in accordance with the invention are added to the aqueous media to be filtered, the differential pressure does not increase as much with time and the permeate flow does not decrease as much as is the case in the filtration of aqueous media to which the formulations to be used in accordance with the invention have not been added.

In another preferred embodiment of the use according to the invention, the formulations additionally contain at least one enzyme which is preferably selected from the group of hydrolases and more particularly from the group of proteases.

In the use according to the invention, the buildup of extracellular layers on the filtration units can take place more slowly or extracellular layers already present can even be removed. Since microorganisms can hide in such layers and are able to proliferate undisturbed, another particularly preferred embodiment of the formulation used in accordance with the invention is characterized by the additional presence of at least one biocide component selected from the groups of alcohols, aldehydes, antimicrobial acids, carboxylic acid esters, acid amides, phenols, phenol derivatives, diphenyls, diphenyl alkanals, urea derivatives, oxygen and nitrogen acetals and formals, benzamidines, isothazolines, phthalimide derivatives, pyridine derivatives, antimicrobial surface-active compounds, guanidines, antimicrobial amphoteric compounds, quinolines, 1,2-dibromo-2,4-dicyanobutane, iodo-2-propynyl butyl carbamate, iodine, iodophores, peroxides. In a most particularly preferred embodiment, the formulation contains as antimicrobial components one or more compounds selected from ethanol, n-propanol, i-propanol, butane-1,3-diol, phenoxyethanol, 1,2-propylene glycol, glycerol, undecylenic acid, citric acid, 2-benzyl-4-chlorophenol, 2,2'-methylene-bis-(6-bromo-4-chlorophenol), 2,4,4'-trichloro-2'-hydroxydiphenylether, N-(4-chlorophenyl)-N-(3,4-dichlorophenyl)-urea, N,N'-(1, 10-decanediyldi-1-pyridinyl-4-ylidene)-bis-(1-octanoamine)-dihydro-chloride, N,N'-bis-(4-chlorophenyl)-3,12-di-imino-2,4,11,13-tetra-azatetra-decane diimidoamide, quaternary ammonium compounds or alkylamines, guanidines, amphoteric compounds.

In a preferred use, the formulations are added proportionally to the water stream of the aqueous medium. In another preferred use, the quantity of formulation added to the aqueous medium is measured via conductivity. In a particularly preferred embodiment, the quantities added to the aqueous medium are measured and controlled via conductivity. In the use according to the invention, a mixing unit is preferably disposed between the point of addition and the filtration unit.

In another preferred embodiment of the use according to the invention, the formulations are made up in a form selected from aqueous solutions, gels, emulsions, pastes, dispersions, powders, granules, flakes, beads, tablets, blocks, extrudates. In a particularly preferred variant, the formulations used consist of a nonaqueous component and a water-soluble capsule preferably based on polyvinyl alcohol. In a most particularly preferred variant, the water-soluble capsule contains part of the formulation ingredients.

As already mentioned, formulations containing ammonium compounds may be employed in the use according to the invention. Where ammonium compounds are used, they are preferably selected from ammonium acetate, ammonium alum, ammonium carbonate, ammonium chloride, ammonium dihydrogen phosphate, ammonium magnesium phosphate, ammonium nitrate, ammonium phosphate, ammonium sulfate and ammonium sulfate saltpetre. In a preferred embodiment, the formulations used in accordance with the invention contain phosphate compounds preferably selected from at least one of the groups of primary orthophosphates with the general formula $M'H_2PO_4$ or $M''(H_2PO_4)_2$, where M' for example represents an alkali metal and M'' represents an alkaline earth metal, and secondary orthophosphates with the general formula $M'_2HPO_4$ or $M''HPO_4$ or tertiary orthophosphates with the general formula $M'_3PO_4$ or $M''_3(PO_4)_2$ and condensed phosphates derived therefrom—so-called metaphosphates and polyphosphates. In a most particularly preferred embodiment, the formulations used in accordance with the invention additionally contain at least one component selected from organic carbon compounds, preferably carbohydrates, lipids, proteins or hydrocarbons, and from the groups of fatty acids, amino acids, alcohols and other carboxylic acids. In very special cases, the formulations used in accordance with the invention additionally contain at least one trace element selected from the group of sulfur compounds and minerals, for example iron, calcium, potassium, magnesium, manganese, zinc compounds, and the trace elements, for example nickel, cobalt, tin, copper, aluminium, iodide, bromide, borate, molybdate compounds.

EXAMPLES

Procedure:

In an industrial trial, water of defined quality was delivered to two parallel 2.5 inch reverse osmosis membranes at a constant pressure of 9 bar. The analysis of the water used is shown in Table 1.

TABLE 1

Water quality of the aqueous medium used in the Examples

| Parameter | Unit | Average value |
|---|---|---|
| m value* | mmol/L | 3.00 |
| pH value | | 7.9 |
| Hardness | °dH | 25.9 |
| Ca content | mg/L | 136 |
| Mg content | mg/L | 30.4 |
| Cl content | mg/L | 186 |
| $SO_4^{2-}$ content | mg/L | 255 |
| $SiO_2$ content (ortho) | mg/L | 7.2 |
| $P_2O_3$ content | mg/L | 0.37 |
| $NH_4^+$ content | mg/L | 0.08 |
| $Fe_{total}$ content | mg/L | 0.17 |
| $NO_2$ content | mg/L | 0.09 |
| $NO_3$ content | mg/L | 28.1 |
| TOC value | mg/L | 3.9 |
| Turbidity | TE/F | 5.7 |
| Conductivity (at 25° C.) | µS/cm | 1390 |
| Solids | mg/L | 4.0 |

*The m value is defined as the quantity of hydrochloric acid which is required to acidify water and characterizes the buffer capacity of the water Water of the quality detailed in Table 1 was continuously fed into the first membrane with no additives over a period of 30 days under a constant pressure of 9 bar. A formulation was added to the water just before the second membrane, being designed to release 3 mg/L ammonium chloride and 6 mg/L potassium hydrogen phosphate hourly into the water. During continuous operation for 30 days, the differential pressure was determined as the difference between the entry pressure and the exit pressure for both membranes. At the same time, the quantity of permeate obtained was recorded in liters per hour. The results of this long-term investigation are set out in Table 2 and show that, where the formulations used in accordance with the invention are added, the performance of the reverse osmosis membranes is improved. This is all the clearer, the longer the filtration units are operated without interruption, i.e. without cleaning and disinfection. In the Comparison Example, i.e. without the addition of a formulation to be used in accordance with the invention, operation had to be stopped after 30 days through blockage of the membranes. By this time, the pressure difference was 2 bar and the permeate flow was only 35 liters per hour. In the case of the Example according to the invention, the pressure difference at the same stage was 1.20 bar and the permeate flow 48 liters per hour.

TABLE 2

Performance of a reverse osmosis membrane in the filtration of aqueous solutions expressed as the differential pressure and the permeate flow as a function of time and the addition of an auxiliary formulation

| | Comparison Example | | Example acc. to invention | |
|---|---|---|---|---|
| Days | Differential pressure [bar] | Permeate in L/h | Differential pressure [bar] | Permeate in L/h |
| 0 | 0.68 | 52 | 0.67 | 57 |
| 1 | 0.72 | 51 | 0.67 | 56 |
| 7 | 0.59 | 47 | 0.55 | 54 |
| 10 | 0.64 | 46 | 0.74 | 53 |
| 15 | 0.79 | 42 | 0.76 | 52 |
| 20 | 1.07 | 43 | 0.70 | 53 |
| 25 | 1.38 | 36 | 1.08 | 50 |
| 30 | 2.00 Stoppage | 35 | 1.20 | 48 |

The invention claimed is:

1. A method for increasing the performance of filtration units with time comprising:
   (a) adding a formulation to aqueous media and passing the formulation and the aqueous media through filtration units to increase the performance of the filtration units with time by at least one of:
      (i) slowing down the buildup of extracellular layers on the filtration units; and
      (ii) removing existing extracellular layers on the filtration units; wherein the formulation comprises an ammonium compound at a quantity of 0.1 to 8 mg of the ammonium compound per liter of the aqueous media, wherein the ammonium compound comprises at least one of ammonium acetate, ammonium alum, ammonium carbonate, ammonium chloride, ammonium dihydrogen phosphate, ammonium magnesium phosphate, ammonium nitrate, ammonium phosphate, ammonium sulfate, or ammonium sulfate saltpeter, and a phosphate compound at a quantity of 0.3 to 20 mg of the phosphate compound per liter of the aqueous media, wherein the phosphate compound comprises at least one of:
         (a) primary orthophosphates having the general formula $M'H_2PO_4$ or $M''(H_2PO_4)_2$;
         (b) secondary orthophosphates having the formula $M'_2HPO_4$ or $M''HPO_4$;
         (c) tertiary orthophosphates having the formula $M'_3PO_4$ or $M''_3(PO_4)_2$; or
         (d) condensed phosphates derived from at least one of groups (a)–(c) wherein M' is an alkali metal and M'' is an alkaline earth metal.

2. A method according to claim 1, wherein the formulation comprises at least one enzyme compound.

3. A method according to claim 1, wherein the formulation is selected from at least one of aqueous solutions, gels, emulsions, pastes, dispersions, powders, granules, flakes, beads, tablets, blocks, and extrudates.

4. A method according to claim 1, wherein the formulation comprises a nonaqueous component and a water-soluble capsule.

5. A method according to claim 4, wherein the water-soluble capsule comprises polyvinyl alcohol, and the water-soluble capsule contains additional ingredients.

6. A method according to claim 1, wherein the formulation comprises at least one biocide component selected from at least one of alcohols, aldehydes, antimicrobial acids, carboxylic acid esters, acid amides, phenols, phenol derivatives, diphenyls, diphenyl alkanes, urea derivatives, oxygen and nitrogen acetals and formals, benzamidines, isothazolines, phthalimide derivatives, pyridine derivatives, antimicrobial surface-active compounds, guanidines, antimicrobial amphoteric compounds, quinolines, 1,2-dibromo-2,4-dicyanobutane, iodo-2-propynyl butyl carbamate, iodine, iodophores, and peroxides.

7. A method according to claim 1, wherein the formulation comprises at least one antimicrobial component comprising at least one of ethanol, n-propanol, i-propanol, butane-1,3-diol, phenoxyethanol, 1,2-propylene glycol, glycerol, undecylenic acid, citric acid, 2-benzyl-4-chlorophenol, 2,2'-methylene-bis-(6-bromo-4-chlorophenol), 2,4,4'-trichloro-2'-hydroxydiphenylether, N-(4-chlorophenyl)-N-(3,4-dichlorophenyl)-urea, N,N'-(1,10-decanediyldi-1-pyridinyl-4-ylidene)-bis-(1-octanoamine)-dihydrochloride, N,N'-bis-(4-chlorophenyl)-3,12-diimino-2,4,11,13-tetra-azatetradecane diimidoamide, quaternary ammonium compounds or alkylamines, guanidines, and amphoteric compounds.

8. A method according to claim 1, wherein the step of adding comprises controlling the amount of the formulation added to the aqueous media by measuring the proportion of the formulation to the aqueous media.

9. A method according to claim 1, wherein the step of adding comprises controlling the amount of the formulation added to the aqueous media by measuring the conductivity of the aqueous media.

10. A method according to claim 1, further comprising:
    (a) mixing the formulation and the aqueous media in a mixing unit before passing the formulation and the aqueous media through the filtration units.

11. A method according to claim 1, wherein the filtration unit comprises at least one membrane filter element having a pore size in the range of 0.0001 to 1 micrometer.

12. A method according to claim 1, further comprising a step of:
    (a) determining the performance of the filtration unit by measuring at least one of the differential pressure and the permeate flow.

* * * * *